H. WILHELMS.
VALVE.
APPLICATION FILED FEB. 16, 1922.
1,416,591. Patented May 16, 1922.
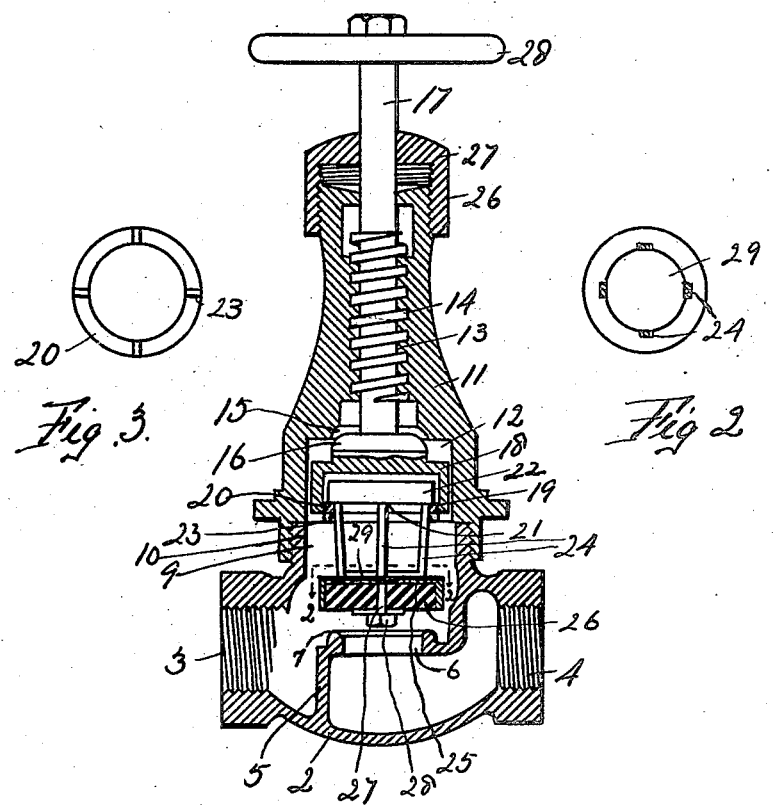
INVENTOR
Harry Wilhelms
By W. W. Williamson, Atty.

UNITED STATES PATENT OFFICE.

HARRY WILHELMS, OF PHILADELPHIA, PENNSYLVANIA.

VALVE.

1,416,591.  Specification of Letters Patent.  Patented May 16, 1922.

Original application filed February 2, 1921, Serial No. 441,753. Divided and this application filed February 16, 1922. Serial No. 536,906.

*To all whom it may concern:*

Be it known that I, HARRY WILHELMS, a citizen of the United States, residing at Philadelphia, in the county of Philadelphia and State of Pennsylvania, have invented new and useful Improvements in a Valve, which is a division of my application bearing Serial Number 441,753 and filing date February 2, 1921, of which the following is a specification.

My invention relates to new and useful improvements in a valve, and has for its object to provide in a device of this character a valve member of unique construction for cooperation with a valve seat whereby the valve may be readily opened and closed and to also provide a sealing member and seat with which it coacts in order that the longitudinal opening through the valve stem casing may be closed from the inside, while the valve remains open thereby permitting the valve stem to be packed without having to close the valve and at the same time preventing any fluid entering the valve stem opening during the time the valve is open which overcomes the necessity of immediate attention to an imperfect packing.

Another object of my invention is to provide a valve body having a valve seat with an arcuate upper edge, a valve stem carrying a sealing member for coaction with a seat, a housing formed with the sealing member, a head loosely retained within the housing by a suitable ring, ribs carried by said head and carrying at their lower ends a disc enclosure in which is located a compressible disc for coaction with the valve seat.

With these ends in view, this invention consists in the details of construction and combination of elements hereinafter set forth and then specifically designated by the claim.

In order that those skilled in the art to which this invention appertains, may understand how to make and use the same, I will describe its construction in detail, referring by numerals to the accompanying drawing forming a part of this application, in which:—

Fig. 1, is a vertical sectional view of the valve with portions shown in elevation to clearly illustrate my invention.

Fig. 2, is a section at the line 2—2 of Fig. 1.

Fig. 3, is a bottom plan view of the retaining ring for holding the valve member in the housing.

In carrying out my invention as here embodied, 2 represents the valve body having the pipe connection openings 3 and 4 separated by a partition 5 having a valve seat 6 formed therewith, said valve seat having an arcuate surface 7 for coaction with the valve member as will be more fully hereinafter described.

Above or in alignment with the valve seat is formed the opening 9 by means of the hub 10, the latter being externally threaded for the reception of the internally threaded end of the valve stem casing 11. In the inner end of said casing is formed a chamber 12 with which communicates the longitudinal stem opening 13 leading to the upper or outer face of the casing and in this stem opening are formed the threads 14. Within the casing 11 between the chamber 12 and the valve stem opening is formed a seat 15 with which coacts the sealing member 16 formed with the threaded valve stem 17 and carrying the integral annular housing 18 open at its lower end and provided with internal threads 19 whereby the retaining ring 20, Fig. 3, may be screwed into the open end of the housing for loosely retaining the valve member 21 in connection with said housing and through the latter with the valve stem.

The valve member 21 comprises a head 22 which is slightly smaller than the housing 18 so as to fit therein and be held in place by the retaining ring 20 as hereinbefore mentioned, which ring is provided with a number of lugs 23 whereby it may be readily revolved for screwing it in or out of the housing. With the head are formed a plurality of spaced ribs 24 converging toward their lower ends, said ribs having the inverted cup shaped disc enclosure 25 formed therewith. A compressible valve disc 26 of rubber or other equivalent material is located within the disc enclosure 25 and through this valve disc passes a pin 27 projecting from the center of the disc enclosure so that said compressible disc may be held in place by a nut 28 threaded on the outer projecting end of the pin 27. In order to strengthen the ribs 24 I provide an enlargement or projection 29 on the enclosure 25 within the space bounded by said ribs.

From the foregoing description it will be seen that when the valve stem is rotated in the proper direction the valve disc will be moved into engagement with its valve seat and the desired pressure applied thereto without rotating the valve disc relative to the valve seat which will cause said parts to snugly engage each other without being worn away as is the case where one revolves and rubs upon the other.

Of course I do not wish to be limited to the exact details of construction as herein shown as these may be varied within the limits of the appended claim without departing from the spirit of my invention.

Having thus fully described my invention, what I claim as new and useful is:—

A valve consisting of a valve body, a partition in said body, a valve seat formed with said partition and having an arcuate upper edge, a valve stem casing detachably connected with said body, said casing having a chamber at its inner end and a longitudinal valve stem opening communicating with said chamber, a seat formed in the casing between the chamber and valve stem opening, a valve stem passing through said opening, a sealing member formed with said stem and adapted to engage said seat when the valve stem is moved outward, an integral housing formed with the inner end of the valve stem, the open end of said housing being internally threaded, a head located in said housing, a retaining ring having external threads for screwing the same into the housing to loosely hold said head within said housing, lugs on said ring whereby the same may be rotated, spaced ribs formed with said head converging toward their lower ends, a disc enclosure formed with the lower ends of said ribs, a pin projecting from the center of said disc enclosure, a compressible disc mounted on said pin within the enclosure, means engaging said pin for holding the compressible disc in place, said disc adapted to engage the valve seat when the valve stem is moved inward, and a cap on the outer end of the valve stem casing.

In testimony whereof, I have hereunto affixed my signature.

HARRY WILHELMS.